(12) United States Patent
Melamed

(10) Patent No.: US 10,736,315 B2
(45) Date of Patent: Aug. 11, 2020

(54) COMPOSITION, SYSTEM AND METHOD FOR ECTOPARASITE DETERRENCE AND TREATMENT

(71) Applicant: Hooman M. Melamed, Marina del Rey, CA (US)

(72) Inventor: Hooman M. Melamed, Marina del Rey, CA (US)

( * ) Notice: Subject to any disclaimer, the term of this patent is extended or adjusted under 35 U.S.C. 154(b) by 0 days.

(21) Appl. No.: 15/810,529

(22) Filed: Nov. 13, 2017

(65) Prior Publication Data

US 2019/0141990 A1    May 16, 2019

(51) Int. Cl.
| | | |
|---|---|---|
| *A01N 25/08* | (2006.01) | |
| *A01N 65/08* | (2009.01) | |
| *A01N 25/02* | (2006.01) | |
| *A01M 29/12* | (2011.01) | |
| *A01N 65/22* | (2009.01) | |
| *A01N 65/28* | (2009.01) | |
| *A45D 8/36* | (2006.01) | |

(52) U.S. Cl.
CPC ............ *A01N 25/08* (2013.01); *A01M 29/12* (2013.01); *A01N 25/02* (2013.01); *A01N 65/08* (2013.01); *A01N 65/22* (2013.01); *A01N 65/28* (2013.01); *A45D 8/36* (2013.01)

(58) Field of Classification Search
None
See application file for complete search history.

(56) References Cited

U.S. PATENT DOCUMENTS

2008/0193387 A1\* 8/2008 De Wolff ............... A61K 36/23
424/47
2017/0049110 A1\* 2/2017 Kolender ............... A01N 25/00

\* cited by examiner

*Primary Examiner* — Nicole P Babson
(74) *Attorney, Agent, or Firm* — Omid E. Khalifeh; Omni Legal Group

(57) ABSTRACT

Natural compositions of three essential oils, a carrier, and a solvent are effective as both a head lice deterrent and treatment of pediculosis capitis. In some embodiments, the compositions comprise, at least, essential tea tree oil present in an amount of about 8-25 wt. %, essential peppermint oil in an amount of about 2-20 wt. %, essential lavender oil in an amount of about 1-25 wt. %, propylene glycol in an amount of about 10-50 wt. %, and SD alcohol 40B in an amount of about 20-80 wt. %. A system comprises the compositions used in combination with articles of manufacture, and more specifically hair accessories such as hairbands, hair ties, and other personal products treated with one or more compositions. A method comprises administering the system to a user.

2 Claims, 6 Drawing Sheets

TREATMENT MIXTURE

- TEA TREE OIL — 201
- PEPPERMINT OIL — 202
- LAVENDER OIL — 203
- PROPYLENE GLYCOL — 204
- SD-ALCOHOL 40B — 205

FIG. 2

COMPOSITION, SYSTEM AND METHOD FOR ECTOPARASITE DETERRENCE AND TREATMENT

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to insecticides and, more particularly, to a composition, system, and method for ectoparasite deterrence and treatment.

BACKGROUND

Head lice, or pediculosis capitis, have infected humans and animals since time immemorial. Many treatments for head lice are known, among them the use of combs, toxic powders, and head shaving are some of the more common treatment approaches. Popular pediculicidal treatments selectively kill head lice, often via pyrethroid insecticidal neurotoxins such as permethrin ((3-phenoxyphenyl)methyl (+/−) cis/trans 3-(2,2-dichloroethenyl)2,2-dimethylcyclopropanecarboxylate). While effective, such treatments can lead to resistance in lice, as well as potential side effects. Natural remedies are also known, among them the use of tea tree oil alone or in combination with other essential oils and carriers. Additionally, the application of certain compositions to various accessories, such as head bands, for the purpose of deterring ectoparasites is also known. However, such known compositions, systems, or methods are to varying degrees inadequate for effective deterrence or treatment of head lice.

Various attempts to address this issue have been made and are recognized in the art. For example, the disclosure of U.S. Pat. No. 6,342,253, incorporated by reference in its entirety herein, generally discloses compositions of three essential oils useful for preventing and/or treating head lice infections. While this disclosure does provide for an essential oil combination that is presumably safer to the skin, its reliance on anise oil and lemon oil limits its efficacy.

Another attempt can be seen with respect to U.S. Patent Application Publication No. 2008/0193387, incorporated by reference in its entirety herein, which generally discloses essential oil compositions and methods incorporating *Lippia javanica*. Again, the reliance on *Lippia javanica*, alone or in combination with other elements, limits this disclosure's appeal and its effectiveness under certain conditions.

Still another attempt can be seen with respect to U.S. Patent Application Publication No. 2012/0093949, incorporated by reference herein in its entirety, which generally discloses a treatment mixture and method for treating head lice that incorporates one or more essential oils. While this disclosure does provide for mixtures having various effective essential oils, the combination of this disclosure's carrier elements with one or more essential oils disclosed therein limits this disclosure's effectiveness under certain circumstances.

Another attempt may be seen with respect to U.S. Pat. No. 8,119,150, incorporated by reference in its entirety herein, which generally discloses a foaming insecticidal hand soap that, in some embodiments, combines essential oils with manufactured chemical compounds to treat ectoparasite infestations. While this disclosure does provide for a variety of hand soap formulations, its disclosure is unsuitable for treatment on a hair accessory as a preventative measure.

Yet another attempt can be seen with respect to U.S. Patent Application Publication No. 2017/0049207, incorporated by reference in its entirety herein, which generally discloses a hair accessory treated with a composition for deterring ectoparasites. While this disclosure does provide for an essential-oil based ectoparasite prevention system, it fails to provide for a composition equal to the task.

Bearing certain similarities to the '9207 disclosure is U.S. Patent Application Publication No. 2014/0000008, also incorporated by reference in its entirety herein, which generally discloses a headband configured to be soaked with a lice-deterring liquid. Although this disclosure does provide for a tea tree oil-based composition, its inclusion of various chemicals in some embodiments diminishes its effectiveness or appeal as an essential oil or natural substance-based treatment option.

Although various solutions have been proposed, none combine the characteristics of the present invention. Thus, there remains a need for a composition, system, and method for ectoparasite deterrence and treatment that addresses these and other deficiencies.

SUMMARY

The present disclosure is directed to composition, system, and method for ectoparasite deterrence and treatment that may provide prevent lice infestations and treat lice infestations, in addition to other properties.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

The present invention comprises a composition, system, and method for ectoparasite deterrence and treatment. In some embodiments, the composition may comprise at least one essential oil and at least one solvent. In some embodiments, the composition may include one or more insecticides in addition to or in place of any element of any composition disclosed herein. In some embodiments, the composition may comprise a first active ingredient, a second active ingredient, a third active ingredient, a carrier, and a solvent. In some embodiments, the composition may comprise a first essential oil as the first active ingredient, a second essential oil as the second active ingredient, a third essential oil as the third active ingredient, a carrier, and a solvent. In some embodiments, the composition may comprise tea tree oil, peppermint oil, lavender oil, propylene glycol, and SD alcohol 40B. In some embodiments, the present invention may comprise about 1-75% a first active ingredient, 1-75% a second active ingredient, 1-75% a third active ingredient, 1-80% carrier, and 1-90% solvent.

In some embodiments, the composition may comprise a ratio of 8-25 wt. % tea tree oil, 2-20 wt. % peppermint oil, 1-25 wt. % lavender oil, 10-50 wt. % propylene glycol, and 20-80 wt. % SD alcohol 40B. Alternatively, an embodiment may comprise 160 g tea tree oil, 60 g peppermint oil, 40 g lavender oil, 200 g propylene glycol, and 540 g SD alcohol 40B. In an embodiment, the composition may comprise a ratio of 16 wt. % tea tree oil, 6 wt. % peppermint oil, 4 wt. % lavender oil, 20 wt. % propylene glycol, and 54 wt. % SD alcohol 40B. Alternatively, an embodiment may comprise 160 g tea tree oil, 60 g peppermint oil, 40 g lavender oil, 200 g propylene glycol, and 540 g SD alcohol 40B.

In some embodiments, the method may comprise the steps of 1) a first mixing of one or more active ingredients and a carrier, 2) a second mixing of the mixture of the first step with the solvent, 3) treating a target object with the composition of the first and second steps, 4) drying and adhering the composition, and 5) administering the treated object to a user. In some embodiments, the method may comprise the steps of 1) a first mixing, wherein tea tree oil, the peppermint oil, the lavender oil, and the propylene glycol are mixed according to a ratio, 2) a second mixing according to a ratio between the mixture of step 1 and an amount of SD alcohol 40B, 3) a spray coating, wherein the mixture of step 2 is sprayed onto a target object such as a rubber band or a hair band, 4) a drying and adhering step, wherein the sprayed mixture of step 3 is allowed to dry and set on the target object, 5) selecting an appropriate user or object upon which to place the target object, and 6) placing the treated object on the user or object.

Furthermore, in other embodiments, the system may comprise at least one target object treated with at least one composition made according to any description or embodiment disclosed herein. It is envisioned that, in some embodiments, the system may comprise a composition comprising tea tree oil, peppermint oil, lavender oil, propylene glycol and SD alcohol 40B and a target object treated with the mixture. The system may further comprise a head band treated with a composition comprising tea tree oil, peppermint oil, lavender oil, propylene glycol and SD alcohol 40B.

In at least one embodiment, the composition may comprise, at least tea tree oil, peppermint oil, and lavender oil as pediculicidal agents and deterrents against pediculosis capitis. Furthermore, in at least one embodiment, propylene glycol may be used as a carrier that may dilute the active ingredients without decreasing their effectiveness. In at least one embodiment, SD alcohol 40B may be used as a solvent to assist in the application process, such as enabling the composition to be sprayed onto a target object. In at least one embodiments, the present invention may provide that a user may treat an object with the composition, the solvent may evaporate, and the remaining composition of the three active ingredients and the carrier may remain at or near the surface of the treated object.

One or more of the above-disclosed embodiments, in addition to certain alternatives, are provided in further detail below with reference to the attached figures. The disclosed subject matter is not, however, limited to any particular embodiment disclosed.

BRIEF DESCRIPTION OF THE DRAWINGS

FIG. 2 illustrates an example composition for ectoparasite deterrence and treatment that may be used in accordance with an embodiment of the invention.

Figure 1:
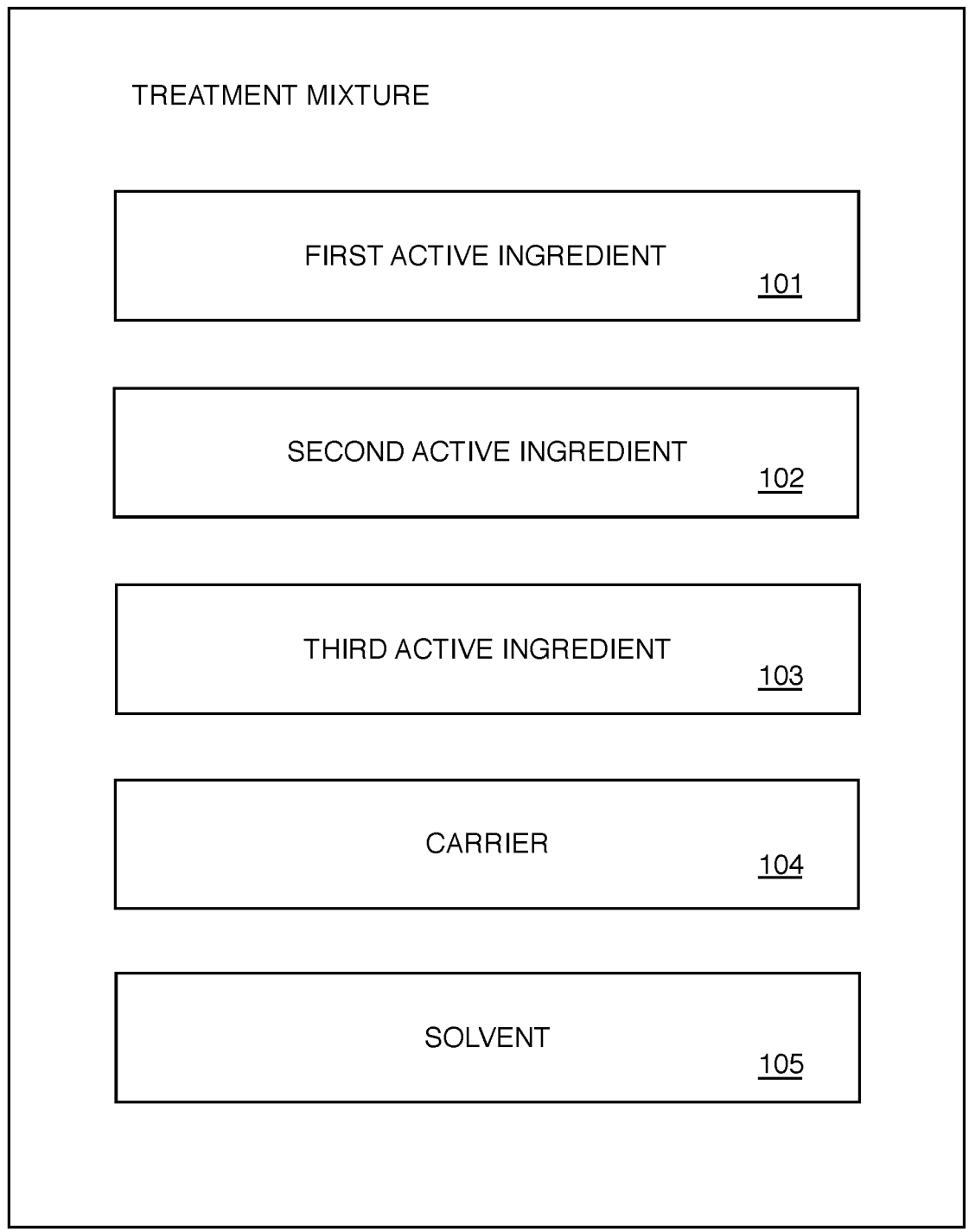
FIG. 1 illustrates an example composition for ectoparasite deterrence and treatment in accordance with an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

FIG. 1 illustrates an example composition for ectoparasite deterrence and treatment in accordance with an embodiment of the invention. In some embodiments, the composition may comprise at least a first active ingredient 101, a second active ingredient 102, a third active ingredient 103, a carrier 104, and a solvent 105. In some embodiments, the composition may comprise only a first active ingredient 101, a carrier 104, and a solvent 105. In some embodiments, the composition may comprise only a first active ingredient 101, a second active ingredient 102, a carrier 104, and a solvent 105. In some embodiments, the composition may comprise a first active ingredient 101, a second active ingredient 102, a third active ingredient 103, and a solvent 105. In some embodiments, the composition may comprise a first active ingredient 101, a second active ingredient 102, a third active ingredient 103, and a carrier 104. As many be gleaned from the foregoing, it is contemplated that any of first active ingredient 101, a second active ingredient 102, a third active ingredient 103, including a fourth or more additional active ingredients, may be combined solely with other active ingredients, with a carrier 104, a solvent 105, without a carrier 104 or a solvent 105, or in any combination of one or more elements disclosed in FIG. 1.

Remaining with FIG. 1, in some embodiments, in some embodiments, the present invention may comprise about 1-75 wt. % first active ingredient 101, 1-75 wt. % second active ingredient 102, 1-75 wt. % third active ingredient 103, 1-80 wt. % carrier 104, and 1-90 wt. % solvent 105. In some embodiments, the composition may comprise a ratio of 8-25 wt. % first active ingredient 101, 2-20 wt. % second active ingredient 102, 1-25 wt. % third active ingredient 103, 10-50 wt. % carrier 104, and 20-80 wt. % solvent 105. Alternatively, an embodiment may comprise 160 g first active ingredient 101, 60 g second active ingredient 102, 40 g third active ingredient 103, 200 g carrier 104, and 540 g solvent 105. In an embodiment, the composition may comprise a ratio of 16 wt. % first active ingredient 101, 6 wt. % second active ingredient 102, 4 wt. % third active ingredient 103, 20 wt. % carrier 104, and 54 wt. % solvent 105. Alternatively, an embodiment may comprise 160 g first active ingredient 101, 60 g second active ingredient 102, 40 g third active ingredient 103, 200 g carrier 104, and 540 g solvent 105.

In some embodiments, first active ingredient 101 may comprise an essential oil selected from African lemon bush (*Lippia javanica*) oil, anise oil, bay oil, bergamot oil, *boronia* oil, canola oil, carrot oil, *cassia* oil, catnip oil, cedarwood oil, chamomile oil, cinnamon oil, citronella oil, clary sage oil, clove oil, *eucalyptus* oil, garlic oil, ginger oil, geranium oil, grapefruit oil, hazelnut oil, jasmine oil, jojoba oil, lavender oil, lavandin oil, lemon oil, lime oil, mandarin oil, nutmeg oil, orange oil, palma rosa oil, patchouli oil, peppermint oil, rosemary oil, rosewood oil, sage oil, sandalwood oil, spear mint oil, star anise oil, tea tree oil, tangerine oil, thyme oil, *verbena* oil, white clover oil, and ylang ylang oil.

In some embodiments, second active ingredient 102 may comprise an essential oil selected from African lemon bush (*Lippia javanica*) oil, anise oil, bay oil, bergamot oil, *boronia* oil, carrot oil, canola oil, *cassia* oil, catnip oil, cedarwood oil, chamomile oil, cinnamon oil, citronella oil, clary sage oil, clove oil, *eucalyptus* oil, garlic oil, ginger oil, geranium oil, grapefruit oil, hazelnut oil, jasmine oil, jojoba oil, lavender oil, lavandin oil, lemon oil, lime oil, mandarin oil, nutmeg oil, orange oil, palma rosa oil, patchouli oil, peppermint oil, rosemary oil, rosewood oil, sage oil, sandalwood oil, spear mint oil, star anise oil, tea tree oil, tangerine oil, thyme oil, *verbena* oil, white clover oil, and ylang ylang oil.

In some embodiments, third active ingredient 103 may comprise an essential oil selected from African lemon bush (*Lippia javanica*) oil, anise oil, bay oil, bergamot oil, *boronia* oil, canola oil, carrot oil, *cassia* oil, catnip oil, cedarwood oil, chamomile oil, cinnamon oil, citronella oil, clary sage oil, clove oil, *eucalyptus* oil, garlic oil, ginger oil, geranium oil, grapefruit oil, hazelnut oil, jasmine oil, jojoba oil, lavender oil, lavandin oil, lemon oil, lime oil, mandarin oil, nutmeg oil, orange oil, palma rosa oil, patchouli oil, peppermint oil, rosemary oil, rosewood oil, sage oil, sandalwood oil, spear mint oil, star anise oil, tea tree oil, tangerine oil, thyme oil, *verbena* oil, white clover oil, and ylang ylang oil.

In some embodiments, first active ingredient 101, second active ingredient 102, and/or third active ingredient 103 may comprise an insecticide. Non-limiting examples of insecticides include any pyrethrin, such as by non-limiting example pyrethrin I paired with piperonyl butoxide; any pyrethyroid insecticide such as by way of non-limiting example permethrin; any organophosphate insecticide such as but not limited to parathion; any carbamate insecticide such as by non-limiting example carbaryl; any organochlorine insecticide such as by way of non-limiting example DDT or bromo-DDT; polymeric organosilicon compounds such as but not limited to dimethicone, and any other insecticidal compound known in the art.

Remaining with FIG. 1, in some embodiments, carrier 104 may be selected from a group comprising, but not limited to, propylene glycol, hexyleneglycol, isostearic acid derivatives, isopropyl palmitate, isopropyl isostearate, diisopropyl adipate, diisopropyl dimerate, maleated soybean oil, octyl palmitate, cetyl lactate, cetyl ricinoleate, tocopheryl acetate, acetylated lanolin alcohol, cetyl acetate, phenyl trimethicone, glyceryl oleate, tocopheryl linoleate, wheat germ glycerides, arachidyl propionate, myristyl lactate, decyl oleate, propylene glycol ricinoleate, isopropyl lanolate, pentaerythrityl tetrastearate, neopentylglycol dicaprylate/dicaprate, isononyl isononanoate, isotridecyl isononanoate, myristyl myristate, triisocetyl citrate, octyl dodecanol, sucrose esters of fatty acids, octyl hydroxystearate and mixtures thereof. Additionally, the carrier may be a polypropylene glycol alkyl ether (PPG alkyl ether), polysorbate 20, polysorbate 80, polysorbate 40, polysorbate 60, polyglyceryl ester, polyglyceryl monooleate, decaglyceryl monocaprylate, propylene glycol dicaprilate, triglycerol monostearate, sorbitol, or any emulsifier, surfactant, or carrier compound, including water, known in the art.

In some embodiments, solvent 105 may be selected from a group comprising, but not limited to, SD alcohol 40B, SD alcohol 40, SD alcohol 30, any specially denatured alcohol, ethanol, and/or any compatible or comparable compounds known in the art.

FIG. 2 illustrates an example composition for ectoparasite deterrence and treatment that may be used in accordance with an embodiment of the invention. In the embodiment depicted in FIG. 2, tea tree oil 201 is selected as first active ingredient 101, peppermint oil 202 is selected as second active ingredient 102, lavender oil 203 is selected as third active ingredient 103, propylene glycol 204 is selected as carrier 104, and SD alcohol 40B 205 is selected as solvent 105.

While the embodiment referenced in FIG. 2 and elsewhere herein may select certain elements as the first active ingredient 101, second active ingredient 102, third active ingredient 103, carrier 104, and solvent 105, any essential oil, compound, or element, or equivalent of any essential oil, compound, or element listed in the paragraphs pertaining to active ingredients, carriers, and solvents may be selected.

Remaining with FIG. 2, in some embodiments, the present invention may comprise about 1-75 wt. % tea tree oil 201, 1-75 wt. % peppermint oil 202, 1-75 wt. % lavender oil 203, 1-80 wt. % propylene glycol 204, and 1-90% SD alcohol 40B 205. Moreover, in some embodiments, the composition may comprise a ratio of 8-25 wt. % tea tree oil 201, 2-20 wt. % peppermint oil 202, 1-25 wt. % lavender oil 203, 10-50 wt. % propylene glycol 204, and 20-80 wt. % SD alcohol 40B 205. Alternatively, an embodiment may comprise 160 g tea tree oil 201, 60 g peppermint oil 202, 40 g lavender oil 203, 200 g propylene glycol 204, and 540 g SD alcohol 40B 205. In an embodiment, the composition may comprise a ratio of 16 wt. % tea tree oil 201, 6 wt. % peppermint oil 202, 4 wt. % lavender oil 203, 20 wt. % propylene glycol 204, and 54 wt. % SD alcohol 40B 205. Alternatively, an embodiment may comprise 160 g tea tree oil 201, 60 g peppermint oil 202, 40 g lavender oil 203, 200 g propylene glycol 204, and 540 g SD alcohol 40B 205.

The following ingredients are an example of Applicant's invention with the percentages being given by weight of the composition and by percentage of the composition:

| Example 1 | | Example 2 | | Example 3 | |
| --- | --- | --- | --- | --- | --- |
| Ingredient | wt. % | Ingredient | wt. % | Ingredient | wt. % |
| Tea Tree Oil | 1 to 75 | Tea Tree Oil | 8 to 25 | Tea Tree Oil | 16 |
| Peppermint Oil | 1 to 75 | Peppermint Oil | 2 to 20 | Peppermint Oil | 6 |
| Lavender Oil | 1 to 75 | Lavender Oil | 1 to 25 | Lavender Oil | 4 |
| Propylene Glycol | 1 to 80 | Propylene Glycol | 10 to 50 | Propylene Glycol | 20 |
| SD Alcohol 40B | 1 to 90 | SD Alcohol 40B | 20 to 80 | SD Alcohol 40B | 54 |
| | Total: 100% | | Total: 100% | | Total: 100% |

Figure 3:
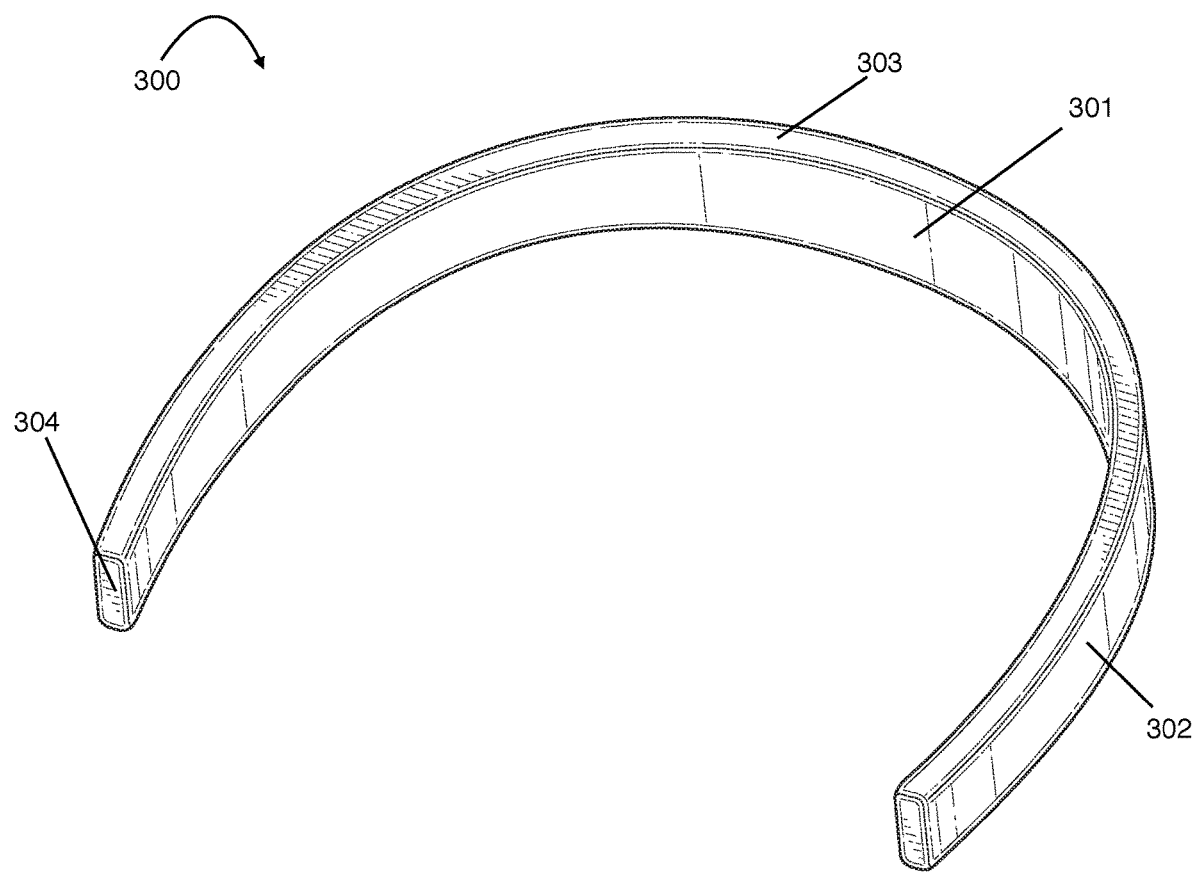
FIG. 3 illustrates an example system for ectoparasite deterrence and treatment in accordance with an embodiment of the present invention.

FIG. 3 illustrates an example system for ectoparasite deterrence and treatment in accordance with an embodiment of the present invention. In the embodiment depicted in FIG. 3, system for ectoparasite deterrence and treatment 300 is shown, along with accessory inside side 301, accessory outside side 302, accessory outside side 303, and accessory base side 304. It is contemplated that, in addition to a hairband embodiment such as is disclosed in FIG. 3, more than one type of accessory may be practiced with the present invention. By way of illustration and not limitation, such an accessory could be a hair bow, a hair barrette, a hair clip, a head band, a scrunchie, a hat, a scarf, or any accessory capable of being worn near or on a user's body.

Remaining with FIG. 3, accessory inside side 301, accessory outside side 302, accessory outside side 303, and accessory base side 304 are also shown. In some embodiments, accessory inside side 301, accessory outside side 302, accessory outside side 303, and accessory base side 304 may comprise separate fabric pieces. In some embodiments accessory inside side 301, accessory outside side 302, accessory outside side 303, and accessory base side 304 may comprise one single piece of fabric. In other embodiments, accessory inside side 301, accessory outside side 302, accessory outside side 303, and accessory base side 304 may comprise the sides of a single element, such as a plastic or wooden item capable of bearing a composition disclosed herein.

In some embodiments wherein accessory inside side 301, accessory outside side 302, accessory outside side 303, and accessory base side 304 are a fabric or other layer encasing an object (not shown), the present invention that one or more of accessory inside side 301, accessory outside side 302, accessory outside side 303, and/or accessory base side 304 may have such a fabric or layer and one or more of accessory inside side 301, accessory outside side 302, accessory outside side 303, and accessory base side 304 may not provide for such a fabric or layer.

Figure 4:
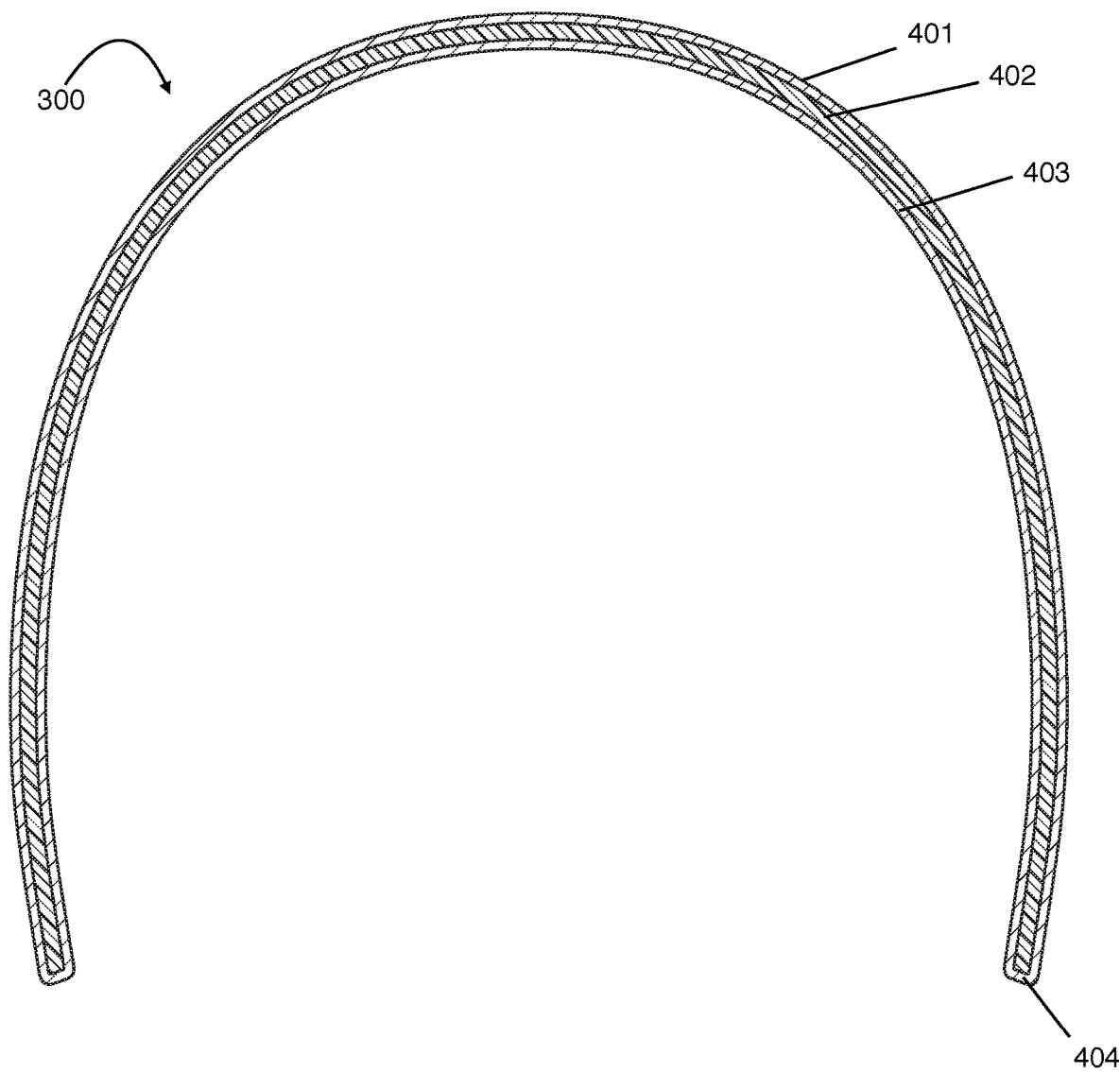
FIG. 4 illustrates a two-sided example system for ectoparasite deterrence and treatment in accordance with an embodiment of the present invention.

Turning attention to FIG. 4, a double-sided embodiment of an example system for ectoparasite deterrence and treatment in accordance with an embodiment of the present invention is shown. In the embodiment depicted, a user may perceive system for ectoparasite deterrence and treatment 300, which may comprise, at least, outside layer portion 401, center element 402, inside layer portion 403, and base layer portion 404.

In some embodiments, at least one of outside layer portion 401, center element 402, inside layer portion 403, and base layer portion 404 may be treated with one or more compositions provided herein. In some embodiments, only outside layer portion 401 and center element 402 may be treated with one or more compositions disclosed herein. In some embodiments, only outside layer portion 401 and base layer portion 404 may be treated with one or more compositions disclosed herein. In some embodiments, outside layer portion 401, inside layer portion 403, and base layer portion 404, but not center element 402, may be treated with one or more compositions disclosed herein. It is contemplated that any of outside layer portion 401, center element 402, inside layer portion 403, and base layer portion 404, alone or in combination with any of outside layer portion 401, center element 402, inside layer portion 403, and base layer portion 404, may be treated with one or more compositions disclosed herein. In any embodiment wherein any surface, layer, or other element is treated with one or more compositions disclosed herein, it is contemplated that such surface, layer, or other element may be treated with any incremental coverage of one or more compositions disclosed herein, such as by way of illustration and not limitation, any coverage amount ranging from one drop of one or more compositions on the surface, fabric, or other element to complete saturation or coverage of the surface, fabric, or other element in or by the one or more compositions disclosed herein.

Figure 5:
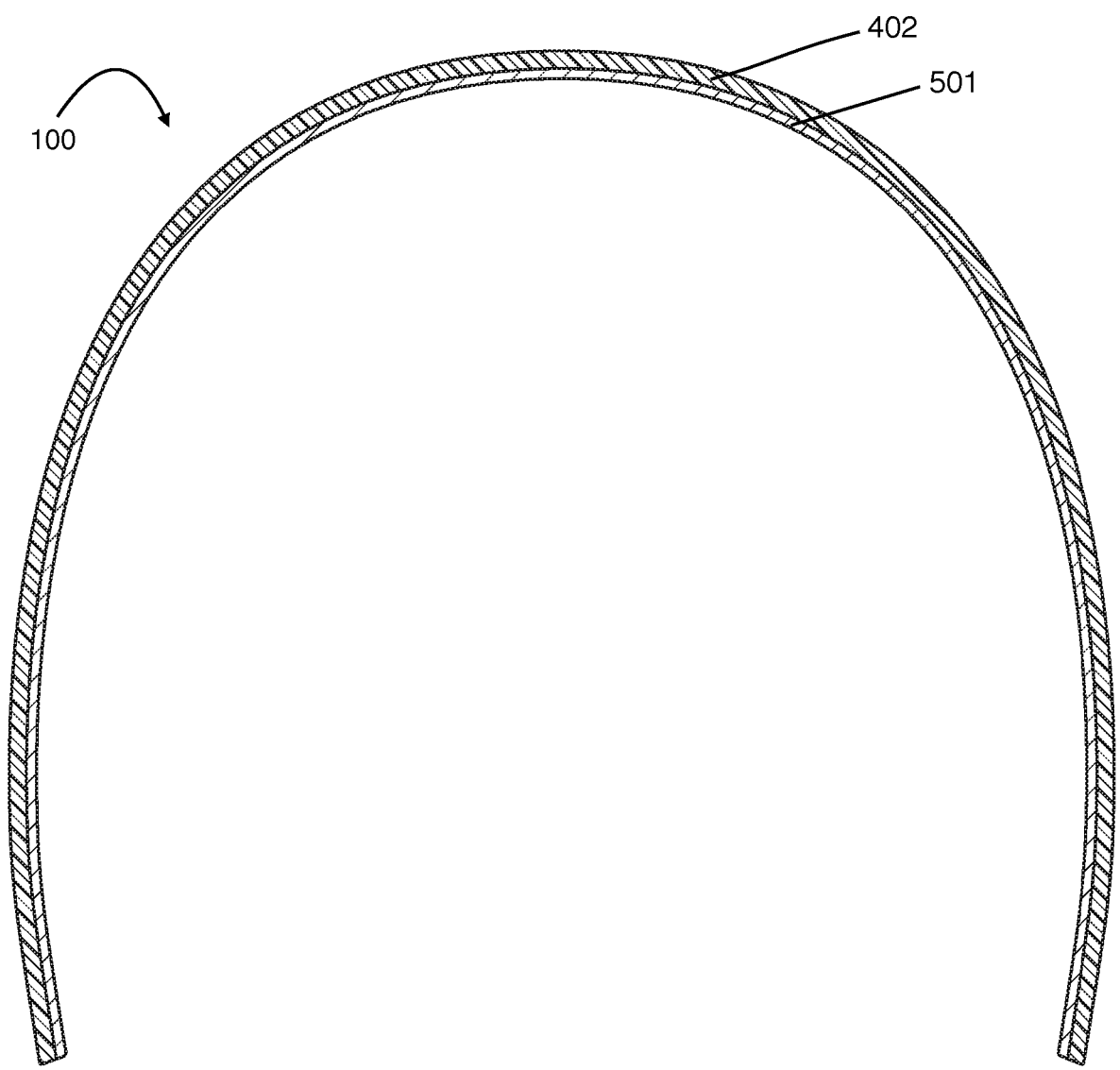
FIG. 5 illustrates a one-sided example system for ectoparasite deterrence and treatment in accordance with an embodiment of the present invention.

With respect to FIG. 5, a one-sided embodiment of an example system for ectoparasite deterrence and treatment in accordance with an embodiment of the present invention is shown. In the embodiment depicted, a user may perceive system for ectoparasite deterrence and treatment 300, which may comprise, at least, center element 402 and treatment layer 501. In some embodiments, some or all of center element 402 may be treated with one or more compositions disclosed herein. In some embodiments, some or all of treatment layer 501 may be treated with one or more compositions disclosed herein. In some embodiments, some or all of both center element 402 and treatment layer 501 may be treated with one or more compositions disclosed herein.

Figure 6:
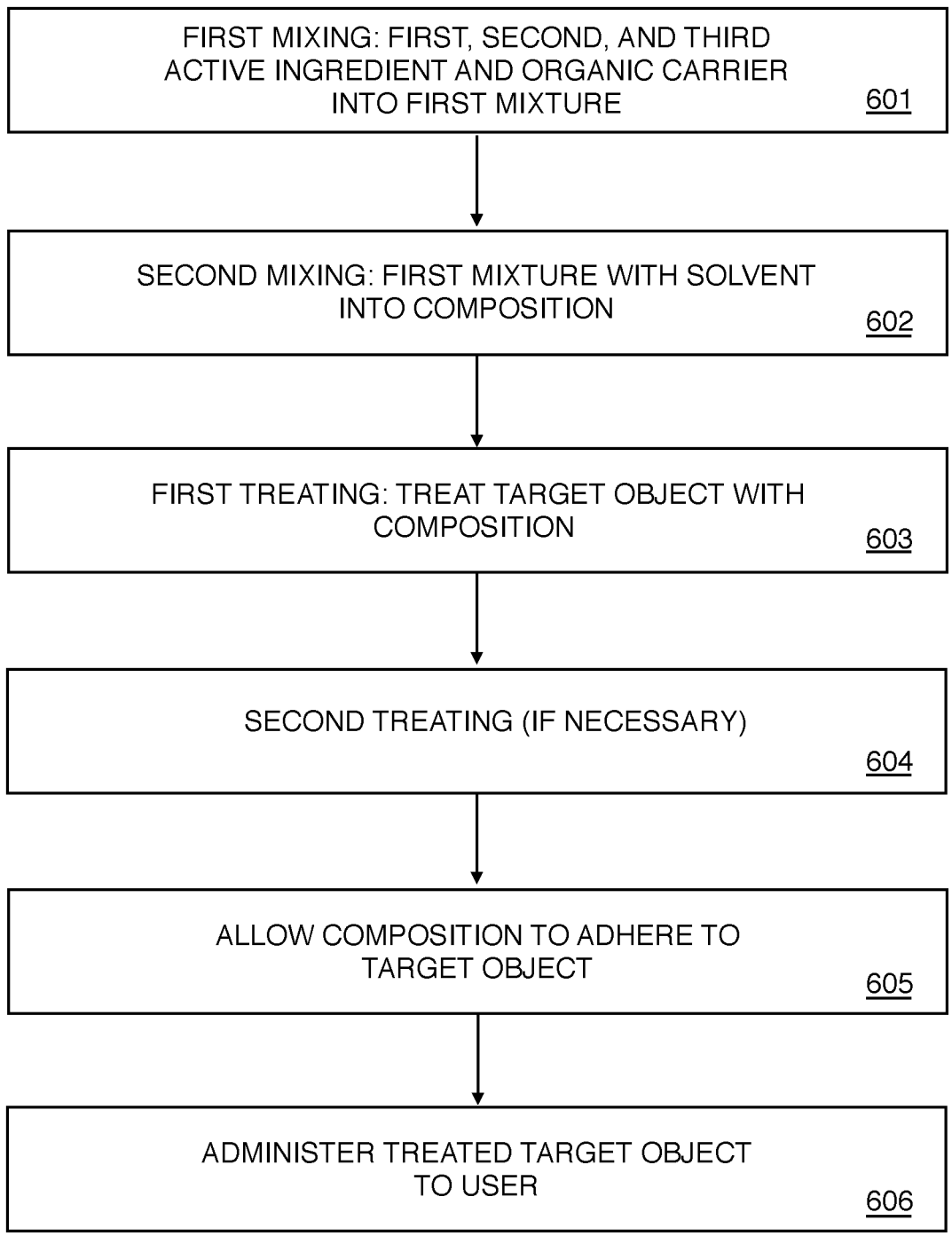
FIG. 6 illustrates an example method for ectoparasite deterrence and treatment in accordance with an embodiment of the present invention.

Turning attention to FIG. 6, an example method for ectoparasite deterrence and treatment may comprise the steps of a first mixing of a first, second, and third active ingredient together with a carrier 601; a second mixing, wherein the product from the first step is mixed with a solvent 602; a first treating of a target object with the composition made in steps one and two 603; a second treating, if necessary, of the target object with the composition 604; an adherence wherein the composition is allowed to (or caused to) set into and/or adhere to the target object 605; and an administration of the treated object to a user 606.

In one embodiment, the steps of FIG. 6 may be performed as follows: In the first mixing step 601, a user may mix together 160 g tea tree oil, 60 g peppermint oil, 40 g lavender oil, and 200 g propylene glycol. In the second mixing step 602, the user may mix the mixture of first step 601 with 540 g SD alcohol 40B. This composition may then be applied to, for purposes of illustration, treatment layer 501 in a first application 603. If this treatment did not apply the composition to treatment layer 501 to the user's satisfaction, a second application 604. Once the composition has adhered to or into the target object, the composition is allowed an adherence time 605 that allows the oils and such to fully permeate and adhere to treatment layer 501. Once the target object has been treated with the composition to the user's satisfaction, the user may distribute the treated target object 606 to an end user who may wear the object and deter or treat lice.

It is contemplated that in some embodiments or with respect to some compositions, certain steps disclosed in FIG. 6 may be unnecessary, such as for example second application 604 if the composition securely adhered to the target object in step 603, or the final distribution step if the object is meant to be put on display, packaged, or otherwise not worn forthwith. As well, some additional or alternate steps may be required to accomplish the goals of the method, such in the above example, a final "packaging" or "display" step. Additionally, in some embodiments, first mixing 601 and second mixing 602 may be combined, or more mixing sequences than first mixing 601 and second mixing 603 may be required.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed present invention. The above description of embodiments of the present invention is not intended to be exhaustive or limited to the precise form disclosed above or to a particular field of usage.

While specific embodiments of, and examples for, the present invention are described above for illustrative purposes, various equivalent modifications are possible for which those skilled in the relevant art will recognize.

While certain aspects of the present invention are presented below in particular claim forms, various aspects of the present invention are contemplated in any number of claim forms. Thus, the inventor reserves the right to add additional claims after filing the application to pursue such additional claim forms for other aspects of the present invention.

What is claimed is:

1. A composition for ectoparasite deterrence and treatment consisting of:
    a.) tea tree oil as a first active ingredient comprising 14-18 wt. % of the total composition,
    b.) peppermint oil as a second active ingredient comprising 4-8 wt. % of the total composition,
    c.) lavender oil as a third active ingredient comprising 2-6 wt. % of the total composition,
    d.) propylene glycol as a carrier comprising 15-25 wt. % of the total composition, and
    e.) SD alcohol 40B as a solvent comprising 45-65 wt. % of the total composition;
    wherein each of the first active ingredient, second active ingredient, third active ingredient, carrier, and solvent together total 100 wt. % of the composition.

2. The A composition for ectoparasite deterrence and treatment consisting of:
    a.) tea tree oil as a first active ingredient comprising about 16 wt. % of the total composition,
    b.) peppermint oil as a second active ingredient comprising about 6 wt. % of the total composition,
    c.) lavender oil as a third active ingredient comprising 4 wt. % of the total composition,
    d.) propylene glycol as a carrier comprising about 20 wt. % of the total composition, and e.) SD alcohol 40B as a solvent comprising about 54 wt. % of the total composition.

\* \* \* \* \*